United States Patent
Tai et al.

(10) Patent No.: US 8,358,742 B2
(45) Date of Patent: Jan. 22, 2013

(54) SYSTEM AND METHOD FOR MANAGING A NETWORK

(75) Inventors: Alan Tai, Hillsborough, NJ (US); Brian Dowd, Beachwood, NJ (US)

(73) Assignee: ITXC IP Holdings S.A.R.L., Luxembourg (LU)

( * ) Notice: Subject to any disclaimer, the term of this patent is extended or adjusted under 35 U.S.C. 154(b) by 229 days.

(21) Appl. No.: 12/959,522

(22) Filed: Dec. 3, 2010

(65) Prior Publication Data
US 2012/0140902 A1   Jun. 7, 2012

(51) Int. Cl.
  *H04M 1/24* (2006.01)
  *H04M 3/08* (2006.01)
  *H04M 3/22* (2006.01)
  *H04M 17/00* (2006.01)

(52) U.S. Cl. ........... 379/10.02; 379/9.04; 379/112.07; 379/114.14; 379/145

(58) Field of Classification Search ......... 379/9, 9.04, 379/10.01, 10.02, 11, 15.01, 29.01, 29.02, 379/32.01, 112.01, 112.07, 114.14, 115.01, 379/121.01, 126, 133, 134, 145
See application file for complete search history.

(56) References Cited

U.S. PATENT DOCUMENTS

| | | | | | |
|---|---|---|---|---|---|
| 4,910,760 | A | * | 3/1990 | Reformato | 379/13 |
| 5,369,680 | A | * | 11/1994 | Borbas et al. | 379/10.02 |
| 5,712,753 | A | * | 1/1998 | Yeh et al. | 361/56 |
| 5,712,908 | A | * | 1/1998 | Brinkman et al. | 379/114.28 |
| 7,388,948 | B2 | * | 6/2008 | Armanino et al. | 379/126 |
| 7,424,103 | B2 | * | 9/2008 | Kernohan et al. | 379/126 |
| 7,570,750 | B2 | * | 8/2009 | Armanino et al. | 379/126 |
| 2012/0224675 | A1 | * | 9/2012 | Lynette et al. | 379/32.01 |

* cited by examiner

*Primary Examiner* — Binh Tieu
(74) *Attorney, Agent, or Firm* — Kaplan Breyer Schwarz & Ottesen, LLP

(57) ABSTRACT

A system and method that may include placing a first telephone call from a data network to a target phone number using a trusted carrier; recording the first telephone call in a reference audio data file; placing a second telephone call from the data network to the target phone number using a suspect carrier; recording the second telephone call in a test audio data file; and comparing the test audio data file to the reference audio data file.

17 Claims, 5 Drawing Sheets

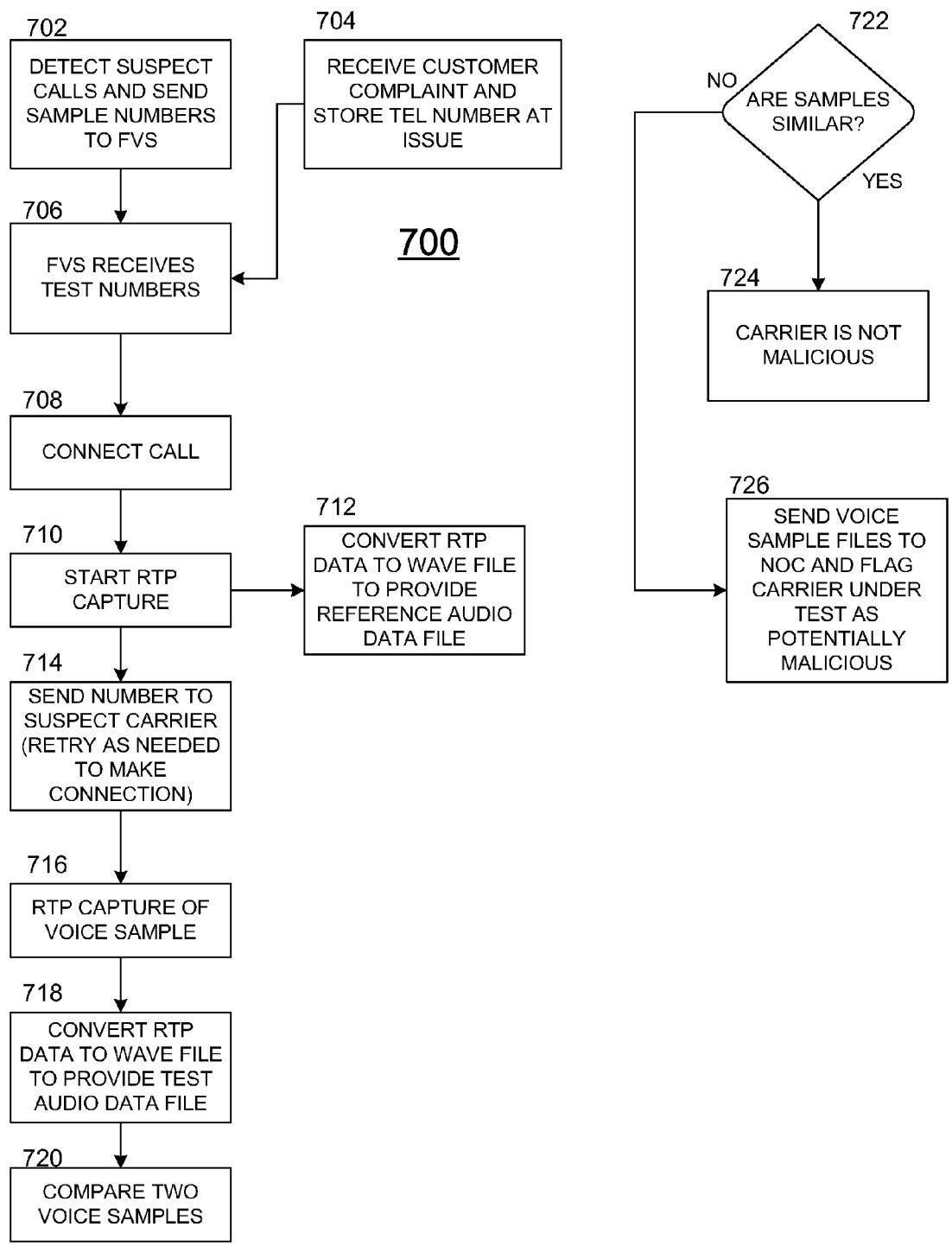

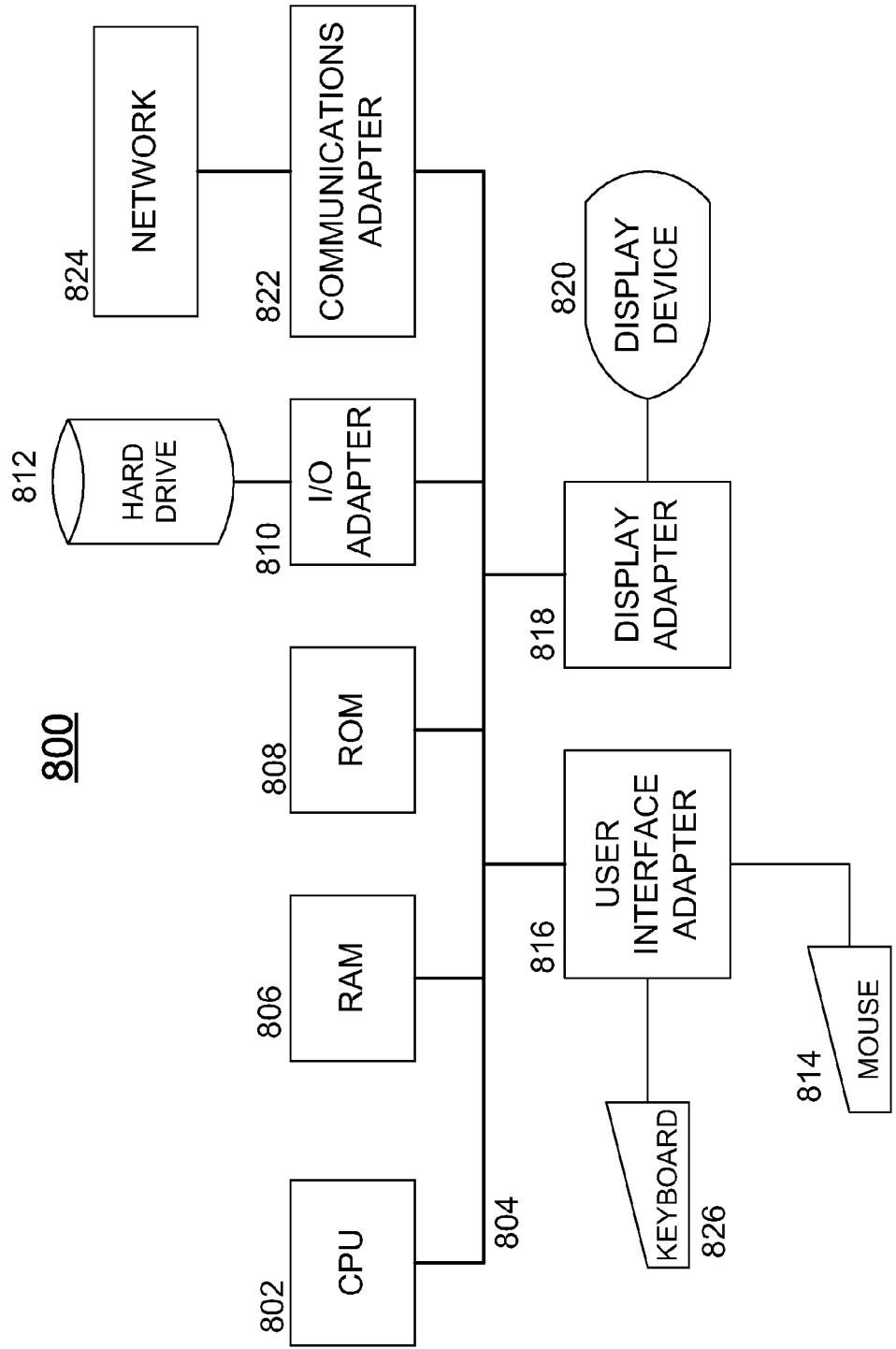

SYSTEM AND METHOD FOR MANAGING A NETWORK

BACKGROUND OF THE INVENTION

The problem of False Answer Supervision (FAS) has plagued the telecommunications industry for years. FAS generally refers to the fraudulent handling of phone calls within one of the PSTN (Public Switched Telephone Network) branches of a phone call made over a PSTN-VOIP-PSTN network, and at that, typically within the recipient PSTN branch of the call path. The fraudulent conduct may include deliberately billing for a period of time in excess of the actual call duration, billing for calls not normally eligible for billing such as calls in which the intended recipient is outside of a service area and calls that are directed to voice mail. Other fraudulent acts include having an FAS service reroute customer traffic to an IVR (Interactive Voice Response system) or send back a false ring back tone and charge customers high-cost destinations and thereby make a huge profit in the process.

To date, approaches for detecting FAS have been based on the use of CDR (Call Data Records) alone. When call durations go down on average, and completion ratios increase, this means a lot of calls are being completed for a very short duration. This, in turn, indicates callers are being routed to an IVR, which answers essentially every call, but callers are also hanging up quickly after realizing they have not reached the party they intended to call.

Using CDR by itself is not particularly effective, and can lead to false positive detections (that is, incorrect determinations that carriers are practicing FAS). Accordingly, there is a need in the art for improved systems and methods for detecting and responding to FAS activity by carriers.

SUMMARY OF THE INVENTION

According to one aspect, the invention is directed to a method that may include placing a first telephone call from a data network to a target phone number using a trusted carrier; recording the first telephone call in a reference audio data file; placing a second telephone call from the data network to the target phone number using a suspect carrier; recording the second telephone call in a test audio data file; and comparing the test audio data file to the reference audio data file.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 4 is a flow diagram of a method for identifying a malicious communications carrier in accordance with another embodiment of the invention; and FIG. 5 is a block diagram of a computer system useable with an embodiment of the present invention.

DETAILED DESCRIPTION OF THE PREFERRED EMBODIMENTS

In the following description, for purposes of explanation, specific numbers, materials and configurations are set forth in order to provide a thorough understanding of the invention. It will be apparent, however, to one having ordinary skill in the art that the invention can be practiced without these specific details. In some instances, well-known features can be omitted or simplified so as not to obscure the present invention. Furthermore, reference in the specification to phrases such as "one embodiment" or "an embodiment" means that a particular feature, structure or characteristic described in connection with the embodiment is included in at least one embodiment of the invention. The appearances of phrases such as "in one embodiment" or "in an embodiment" in various places in the specification do not necessarily all refer to the same embodiment.

Figure 1:
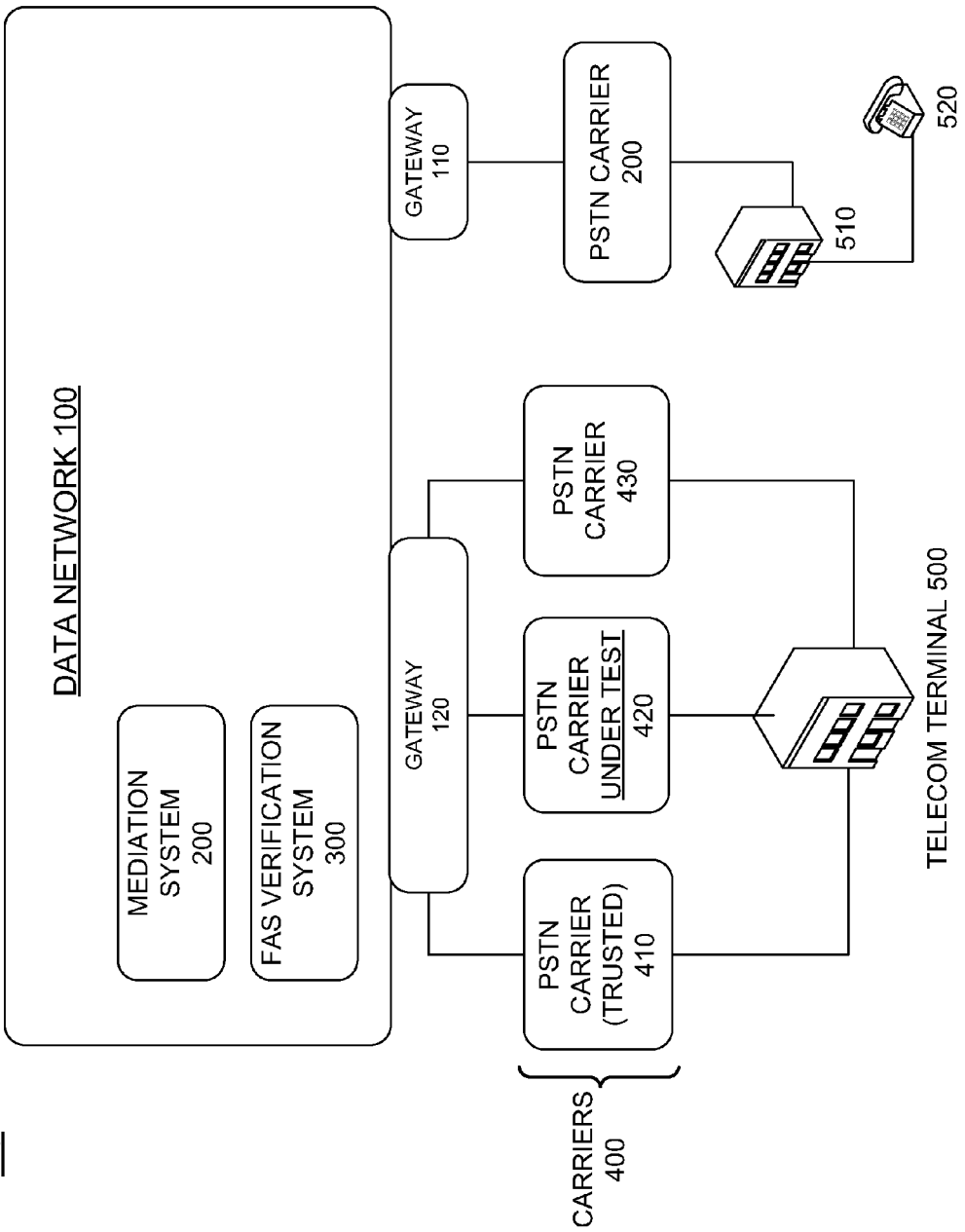
FIG. 1 is a block diagram of a telecommunications system in accordance with an embodiment of the present invention.

FIG. 1 is a block diagram of a telecommunications system 10 in accordance with an embodiment of the present invention. System 10 may include data network 100, which preferably employs IP protocol, and which preferably includes mediation system 200 and/or FAS verification system 300. System 10 may further include PSTN-IP gateways 110 and 120. System 10 may further include PSTN carriers 200, 410, 420, and/430; telecom terminals (such as consumer telephone lines) 500 and 510, which may be accessed by devices such as a traditional telephone 520 or a range of other communication devices. One or more of carriers 400 may include PSTN/VOIP carriers in place of, or in addition to, traditional PSTN carriers. More detail is provided on various of the above components of system 10 in the following.

Figure 2:
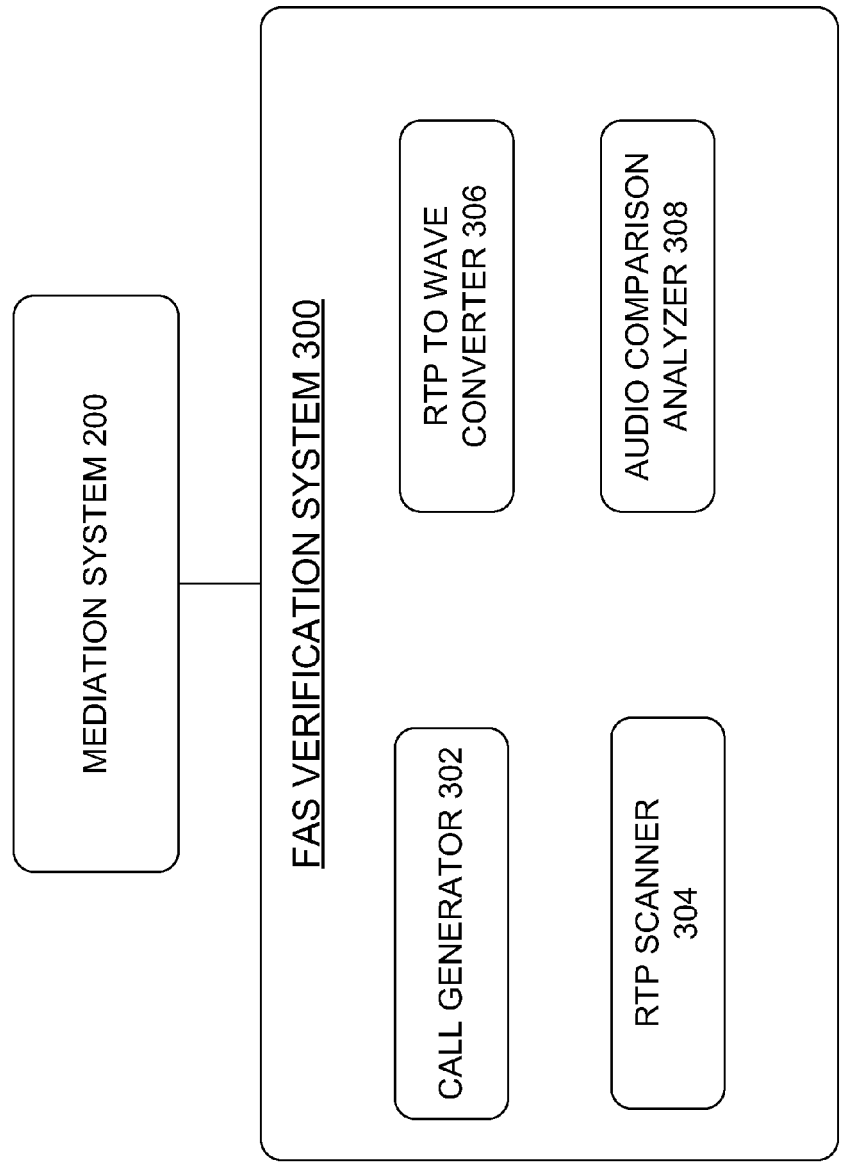
FIG. 2 is a block diagram showing the mediation system and FAS verification system of the telecommunications system of FIG. 1 in accordance with an embodiment of the invention.

FIG. 2 is a block diagram showing the mediation system 200 and FAS verification system 300 of the telecommunications system 10 of FIG. 1 in accordance with an embodiment of the invention. FAS Verification System (also referred to herein as "FVS") 300 may include call generator 302, RTP (Real-Time Protocol) scanner 304, RTP to WAVE converter 306, and audio comparison analyzer 308. FAS verification system 300 may include one or more computing devices and suitable audio recording and audio data storage equipment that may record/store audio data in either analog or digital form. Call generator 302 may be a SIP (Session Initiation Call) call generator, VOIP/TDM call generator, or any other suitable type of call generator.

In one embodiment, mediation system 200 may form an initial determination that a carrier is suspicious (i.e. engaging in false answer supervision), and then transmit an identification (ID) of the suspected carrier to FVS 300 to test the suspected carrier to determine with greater certainty whether the suspected carrier is in fact operating in a fraudulent manner. This process is discussed in greater detail in connection with FIGS. 3 and 4 below.

Figure 3:
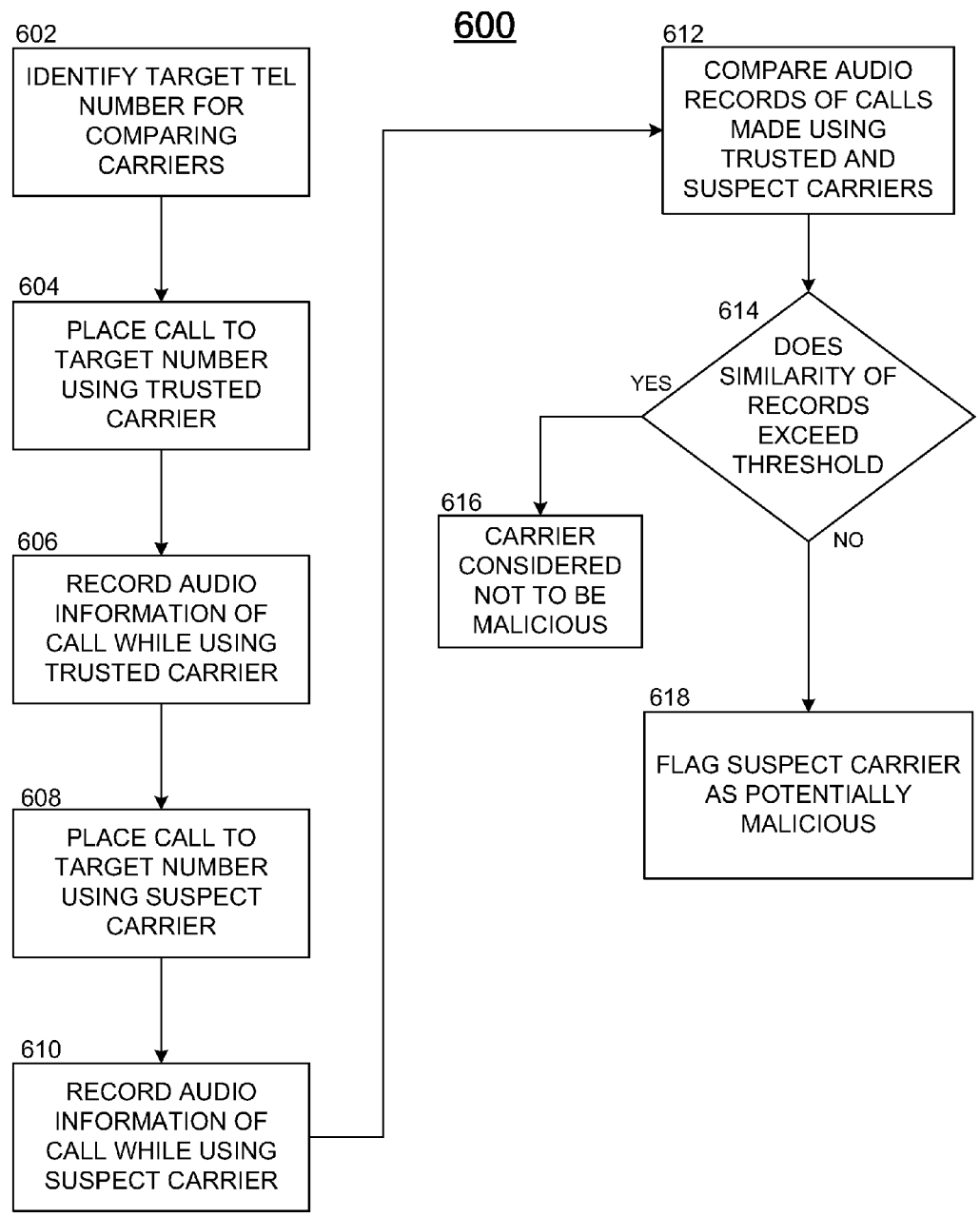
FIG. 3 is a flow diagram of a method for identifying a malicious communications carrier in accordance with an embodiment of the invention.

FIG. 3 is a flow diagram of a method 600 for identifying a malicious communications carrier in accordance with an embodiment of the invention. The steps of the method illustrated in FIGS. 3 and 4 may be performed by FAS verification system 300 using appropriate computing devices and/or audio recording and storage equipment included therein. However, alternatively, other components of system 10 may be employed in combination to perform the steps discussed in connection with FIGS. 3 and 4. The invention is not limited to the use of any particular device or combination of devices for performing the steps of FIG. 3 or 4. In some embodiments, more than one phone number may be used to evaluate a suspect carrier 420 being tested for fraudulent activity.

At step 602, the method preferably identifies a target telephone number for use in comparing the operation of a suspect carrier 420 with the operation of a trusted carrier 410. At step 604, the method places a call to the target telephone number using trusted carrier 410. At step 606, the results of the phone call using trusted carrier 410 are preferably recorded. The audio data may be initially captured using the RTP format, and may then be later converted into the WAVE (Waveform Audio File Format) format for data comparison purposes. An audio data file may be created to stored the audio information in either RTP or WAVE format. The data file produced from the audio data obtained in step 606 may be referred to herein as a reference record.

At step 608, the method preferably places a telephone call to the target telephone number using the suspect carrier (the carrier being tested) 420. At step 610, the method preferably records the audio information arising from the call to the target telephone number using the suspect carrier 420. The recorded data obtained in steps 606 and 610 may be converted into any suitable format that is convenient for conduct a comparison of the two recordings, such as, but not limited to, the WAVE format. The data file produced from the audio data obtained in step 610 may be referred to herein as a test record.

At step 612, the audio files obtained in steps 606 and 610, respectively, are preferably compared (614). If the similarity of the two files meets or exceeds a reliability threshold, which may be set at 40% of the audio data, the suspect carrier is deemed not to be malicious (616). If the similarity of two files arising from the comparison in step 614 is less than the reliability threshold, the suspect carrier is preferably flagged as being potentially malicious (618). If the status indicated in step 618 is applied to the suspect carrier, the status of the suspect carrier may subsequently be investigated further using a combination of the comparison results from step 614 and data from the CDR (call data records). The present invention is not limited to employing a reliability threshold of 40%. Reliability threshold levels above or below 40% may be employed.

The results of the comparison conducted in step 614 may alternatively be expressed as including a degree of disparity between the reference audio file obtained using the trusted carrier and the test audio file obtained from the suspect carrier. When using this alternative approach, when the degree of disparity between the two audio files meets or exceeds a "warning threshold," the suspect carrier is flagged as being potentially malicious. In other embodiments, instead of generating a "malicious or non-malicious" conclusion from step 614, different levels of suspicion of the suspect carrier may be established as a function of the extent of the disparity between the two data files.

When comparing audio data files in step 614, one or more different audio attributes may be used for the comparison. These attributes may include but are not limited to: message duration; pitch of an audio message or ring tone; length of delay before a voice or other sound begins; volume (i.e. amplitude) of the sound in the recording; "identity" of any voice data obtained (i.e. this could include distinctions between the voices of separate persons, between the voice of a person and that of a machine, or between two separate machine-generated voices).

It is also contemplated that the same procedure above may be repeated, so that three or more, for example, comparisons are made prior to making a determination that a fraud is occurring.

FIG. 4 is a flow diagram of a method 700 for identifying a malicious communications carrier in accordance with another embodiment of the invention. At step 702, the mediation system 200 may detect suspect calls and sends one or more sample telephone numbers to FVS 300 (step 706) to evaluate the suspect carrier. Alternatively, at step 704, system 10 may receive a customer complaint about a specific telephone number and provide the number to mediation system 200 (step 706) to evaluate the suspect carrier.

At step 708, FVS 300 preferably places a telephone call to the target telephone number using a trusted carrier 410. Thereafter, FVS 300 preferably captures (710) RTP audio data capture of the telephone call. At step 712, FVS 300 converts the RTP data into WAVE data to create a reference audio data file. The audio data file may include, but is not limited to, voice data.

At step 714, FVS 300 places a call to the same target telephone number using the suspect carrier 420. If needed, the target telephone number may be dialed repeatedly until a connection is established. RTP data capture (716) may then be conducted. The RTP data may then be converted (718) WAVE data to generate a test audio data file.

At step 720, FVS 300 compares the reference audio data file to the test audio data file. If the degree of similarity meets or exceeds the reliability threshold (722) the suspect carrier 420 is deemed not be malicious. The reliability threshold may, for instance, be set to 40%. However, the reliability threshold may be set to be above or below the 40% level.

If the similarity level is below 40% (722) after the comparison, the FVS 300 flags the suspect carrier 420 as being possibly malicious and preferably directs the above-described comparison to be repeated with one, two, or more than two additional target telephone numbers to either verify or refute the result of the first comparison.

At step 726, after one or more comparisons corroborate the status of carrier 420 as suspicious, the FVS 300 preferably sends the voice sample files to the Network Operations Center (NOC) for further evaluation.

Combination of FAS and CDR

In one embodiment, the above-described system and method can be productively combined with CDR-based methods for optimizing the detection of FAS call handling. Analysis of call data records may be employed to generate a list of telephone numbers, and the carriers used to service that list of telephone numbers, that appear to have been fraudulently tampered with. Thereafter, the FAS verification system can compare the audio files of calls to the telephone numbers on the list made using trusted carriers with audio files obtained using suspect carriers, as described above, to determine which carriers are in fact behaving fraudulently.

FIG. 5 is a block diagram of a computing system 800 adaptable for use within any of the computing and/or communication entities shown in FIGS. 1 and 2. In computing system 800, central processing unit (CPU) 802 can be coupled to bus 804. In addition, bus 804 can be coupled to random access memory (RAM) 806, read only memory (ROM) 808, input/output (I/O) adapter 810, communications adapter 822, user interface adapter 806, and display adapter 818.

In an embodiment, RAM 806 and/or ROM 808 can hold user data, system data, and/or programs. I/O adapter 810 can connect to storage device 812, which may be a hard drive, a compact disk device, a USB or a Pen Drive, a Removable disk or other mass storage device available within computing system 800. Communications adapter 822 can couple computing system 800 to a local, wide-area, or global network 824. User interface adapter 816 can couple user input devices, such as keyboard 826, scanner 828 and/or pointing device 814, to computing system 800. Moreover, display adapter 818 can be driven by CPU 802 to control the display on display device 820. CPU 802 can be any general or any special purpose CPU.

It is noted that the methods and apparatus described thus far and/or described later in this document can be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention can also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications can be made to the illustrative embodiments and that other arrangements can be devised without departing from the spirit and scope of the present invention as defined by the appended claims.

The invention claimed is:

1. A method comprising:
placing a first telephone call to a target phone number using a trusted carrier;
creating a record of the first telephone call, the record being a reference record;
placing a second telephone call to the target phone number using a test carrier;
creating a record of the second telephone call, the second communication session record being a test record; and
comparing the test record with the reference record.

2. The method of claim 1 further comprising:
establishing a warning threshold for an extent of disparity between the test record and reference record.

3. The method of claim 2 further comprising:
identifying the test carrier as safe only if the extent of disparity between the test record and reference record is below the warning threshold.

4. The method of claim 2 further comprising:
flagging the test carrier as malicious only if the extent of disparity between the test record and the reference record is equal to or greater than the warning threshold.

5. The method of claim 2 wherein the warning threshold is equal to between a 50% and a 70% disparity level between the test record and the reference record.

6. The method of claim 2 wherein the warning threshold is equal to about a 60 percent disparity between the test record and the reference record.

7. A telecommunications system, comprising:
a data network for bridging telephone calls from a first PSTN (Public Switched Telephone Network) to a second PSTN;
a mediation system in communication with the data network for detecting suspected False Answer Supervision (FAS) activity at a target telephone number by a first carrier within the second PSTN, the first carrier being a suspect carrier;
a gateway in communication with the data network and the second PSTN for:
routing a first telephone call to the target telephone number using a trusted carrier; and
routing a second telephone call to the target telephone number using the suspect carrier; and
an FAS verification system (FVS) for:
recording the first telephone call using the trusted carrier in a reference audio file; and
recording the second telephone call using the suspect carrier in a test audio file.

8. The system of claim 7 wherein the FVS comprises:
an audio comparison analyzer for comparing the test audio file to the reference audio file.

9. The system of claim 8 wherein the FVS is operable to flag the suspect carrier as malicious if the comparison by the audio comparison analyzer results in a similarity level between the reference audio file and the test audio file that is below a predetermined reliability threshold.

10. The system of claim 8 wherein the reliability threshold is 40%.

11. The system of claim 7 wherein the FVS comprises:
an RTP scanner for storing RTP packets from the first and second telephone calls.

12. The system of claim 11 wherein the FVS further comprises:
an RTP-to-WAVE converter for converting the RTP packets into WAVE files.

13. A method comprising:
placing a first telephone call from a data network to a target phone number using a trusted carrier;
recording the first telephone call in a reference audio data file;
placing a second telephone call from the data network to the target phone number using a suspect carrier;
recording the second telephone call in a test audio data file; and
comparing the test audio data file to the reference audio data file.

14. The method of claim 13 further comprising:
determining a degree of similarity of the test audio file to the reference audio file.

15. The method of claim 14 further comprising:
flagging the suspect carrier as malicious only if the degree of similarity is below a predetermined reliability threshold.

16. The method of claim 14 wherein the method is repeated plural times prior to said flagging.

17. The method of claim 13 wherein the comparing step compares at least one attribute of the audio data files selected from the group consisting of:
message duration; pitch; a length of delay before a voice or other sound begins; sound volume; and an "identity" of a producer of any voice data obtained.

* * * * *